US010679207B1

(12) United States Patent
Huffines et al.

(10) Patent No.: US 10,679,207 B1
(45) Date of Patent: Jun. 9, 2020

(54) BILL SPLITTING AND ACCOUNT DELEGATION FOR NFC

(71) Applicant: Blazer and Flip Flops, Inc., San Diego, CA (US)

(72) Inventors: Christopher Michael Huffines, Williston, VT (US); John Cronin, Bonita Springs, FL (US)

(73) Assignee: Blazer and Flip Flops, Inc., San Diego, CA (US)

( * ) Notice: Subject to any disclaimer, the term of this patent is extended or adjusted under 35 U.S.C. 154(b) by 282 days.

(21) Appl. No.: 14/970,139

(22) Filed: Dec. 15, 2015

Related U.S. Application Data

(60) Provisional application No. 62/093,101, filed on Dec. 17, 2014.

(51) Int. Cl.
| G06Q 20/32 | (2012.01) |
| G06Q 20/40 | (2012.01) |
| G06Q 20/38 | (2012.01) |

(52) U.S. Cl.
CPC ....... *G06Q 20/3278* (2013.01); *G06Q 20/322* (2013.01); *G06Q 20/382* (2013.01); *G06Q 20/401* (2013.01)

(58) Field of Classification Search
CPC ........ G06Q 10/00; G06Q 20/00; G06Q 30/00; G06Q 40/00
USPC ....................................................... 705/3–44
See application file for complete search history.

(56) References Cited

U.S. PATENT DOCUMENTS

| 5,473,143 | A | 12/1995 | Vak et al. | |
| 6,973,172 | B1 | 12/2005 | Bitove et al. | |
| 7,828,204 | B2 | 11/2010 | Fiebiger et al. | |
| 7,832,646 | B1 | 11/2010 | Leason | |
| 7,844,512 | B2 | 11/2010 | Richards et al. | |
| 8,065,190 | B2 * | 11/2011 | Collas .................. | G06Q 20/12 705/26.1 |
| 8,105,772 | B2 | 4/2012 | Mardikar et al. | |
| 8,170,922 | B2 * | 5/2012 | Cavagnaro ............ | G06Q 20/12 705/26.1 |
| 8,306,860 | B2 | 11/2012 | Dunsmore et al. | |
| 8,474,701 | B1 | 7/2013 | Meek et al. | |

(Continued)

FOREIGN PATENT DOCUMENTS

| CN | 103679475 | 3/2014 |
| EP | 2 533 186 | 12/2012 |

(Continued)

OTHER PUBLICATIONS

"The Mobile Payments and NFC Landscape: A U.S. Perspective", A Smart Card Alliance Payments Council White Paper, Publication No. PC-11002. (Year: 2011).*

(Continued)

*Primary Examiner* — Frantzy Poinvil
(74) *Attorney, Agent, or Firm* — Polsinelli LLP

(57) ABSTRACT

The present invention includes systems and methods directed towards bill splitting and account delegation using near field communications (NFC). The systems and methods enable an NFC device to split a single bill into two or more portions, allow one or more users to apply gift cards, coupons, promotions, tips or other modifications to the amount due, and facilitate multiple different types of payment from two or more users on the same bill using NFC.

19 Claims, 20 Drawing Sheets

(56) References Cited

U.S. PATENT DOCUMENTS

| | | | |
|---|---|---|---|
| 8,494,913 B2* | 7/2013 | Cavagnaro | G06Q 20/12 705/26.1 |
| 8,498,900 B1 | 7/2013 | Spirin et al. | |
| 8,577,803 B2 | 11/2013 | Chatterjee et al. | |
| 8,690,054 B1 | 4/2014 | Cummins et al. | |
| 8,714,439 B2* | 5/2014 | Brendell | G06Q 20/325 235/375 |
| 8,718,554 B2 | 5/2014 | Abel | |
| 8,762,211 B2* | 6/2014 | Killian | G06Q 20/0855 705/17 |
| 8,783,561 B2 | 7/2014 | Wesley | |
| 8,788,324 B1 | 7/2014 | Shetty et al. | |
| 8,799,085 B2 | 8/2014 | Fisher | |
| 8,805,726 B2 | 8/2014 | Fisher | |
| 8,811,895 B2 | 8/2014 | Reisgies et al. | |
| 8,954,004 B1 | 2/2015 | Wang et al. | |
| 9,582,826 B2 | 2/2017 | Calman et al. | |
| 9,646,303 B2 | 5/2017 | Karpenko et al. | |
| 9,672,511 B2 | 6/2017 | Lim | |
| 9,734,091 B2 | 8/2017 | Kadi et al. | |
| 9,985,699 B1 | 5/2018 | Cronin | |
| 9,990,621 B1* | 6/2018 | Ng | G06Q 20/29 |
| 10,204,335 B1* | 2/2019 | Donavalli | G06Q 20/3224 |
| 10,262,311 B1 | 4/2019 | Cronin | |
| 10,262,318 B1 | 4/2019 | Cronin | |
| 10,348,368 B2 | 7/2019 | Cronin | |
| 10,516,964 B2 | 12/2019 | Dotan et al. | |
| 10,580,011 B1 | 3/2020 | Cronin et al. | |
| 2002/0026348 A1 | 2/2002 | Fowler et al. | |
| 2002/0062249 A1 | 5/2002 | Iannacci | |
| 2004/0010597 A1 | 1/2004 | Kirschner et al. | |
| 2004/0220876 A1 | 11/2004 | Liu | |
| 2005/0004839 A1 | 1/2005 | Bakker et al. | |
| 2005/0210240 A1 | 9/2005 | Barron | |
| 2006/0131390 A1 | 6/2006 | Kim | |
| 2006/0206378 A1 | 9/2006 | Ficalora | |
| 2007/0022375 A1 | 1/2007 | Walker | |
| 2007/0032225 A1 | 2/2007 | Konicek et al. | |
| 2007/0190939 A1 | 8/2007 | Abel | |
| 2007/0192198 A1 | 8/2007 | Schwarz | |
| 2007/0203850 A1 | 8/2007 | Singh et al. | |
| 2008/0011837 A1 | 1/2008 | Wesley | |
| 2008/0078831 A1 | 4/2008 | Johnson et al. | |
| 2008/0109335 A1 | 5/2008 | Keohane et al. | |
| 2008/0120155 A1 | 5/2008 | Pliha | |
| 2008/0133351 A1 | 6/2008 | White et al. | |
| 2008/0147496 A1 | 6/2008 | Bal et al. | |
| 2008/0150678 A1 | 6/2008 | Giobbi et al. | |
| 2008/0167017 A1 | 7/2008 | Wentker et al. | |
| 2008/0167961 A1 | 7/2008 | Wentker et al. | |
| 2009/0082001 A1 | 3/2009 | Rahul et al. | |
| 2009/0132362 A1 | 5/2009 | Fisher et al. | |
| 2009/0138365 A1 | 5/2009 | Mueller et al. | |
| 2009/0156190 A1 | 6/2009 | Fisher | |
| 2009/0192935 A1 | 7/2009 | Griffin et al. | |
| 2009/0276305 A1 | 11/2009 | Clopp | |
| 2010/0010887 A1 | 1/2010 | Karlin et al. | |
| 2010/0088149 A1 | 4/2010 | Sullivan et al. | |
| 2010/0114677 A1 | 5/2010 | Carlson et al. | |
| 2010/0124914 A1 | 5/2010 | Schmidt et al. | |
| 2010/0125510 A1 | 5/2010 | Smith et al. | |
| 2010/0190437 A1 | 7/2010 | Buhot | |
| 2010/0211507 A1 | 8/2010 | Aabye et al. | |
| 2010/0211679 A1 | 8/2010 | Kumar et al. | |
| 2010/0274691 A1 | 10/2010 | Hammad et al. | |
| 2010/0274853 A1 | 10/2010 | Carlson et al. | |
| 2010/0309807 A1 | 12/2010 | Rautiainen | |
| 2010/0312692 A1 | 12/2010 | Teicher | |
| 2011/0016050 A1 | 1/2011 | Evans | |
| 2011/0153438 A1 | 6/2011 | Dragt | |
| 2011/0167133 A1 | 7/2011 | Jain | |
| 2011/0202402 A1 | 8/2011 | Fowler et al. | |
| 2011/0218849 A1 | 9/2011 | Rutigliano et al. | |
| 2011/0230209 A1 | 9/2011 | Kilian | |
| 2011/0258249 A1 | 10/2011 | Biggs et al. | |
| 2011/0276511 A1 | 11/2011 | Rosenberg | |
| 2011/0313922 A1 | 12/2011 | Ben Ayed | |
| 2011/0320345 A1 | 12/2011 | Taveau et al. | |
| 2012/0036076 A1 | 2/2012 | Vanderwall et al. | |
| 2012/0078701 A1 | 3/2012 | Woods | |
| 2012/0078735 A1 | 3/2012 | Bauer et al. | |
| 2012/0089461 A1 | 4/2012 | Greenspan | |
| 2012/0101882 A1 | 4/2012 | Todd | |
| 2012/0109730 A1 | 5/2012 | Yoder et al. | |
| 2012/0136732 A1 | 5/2012 | McMillen et al. | |
| 2012/0148077 A1 | 6/2012 | Aldaz et al. | |
| 2012/0160912 A1 | 6/2012 | Laracey | |
| 2012/0166332 A1* | 6/2012 | Naaman | G06Q 20/102 705/40 |
| 2012/0185315 A1 | 7/2012 | VanDerheide et al. | |
| 2012/0209749 A1 | 8/2012 | Hammad et al. | |
| 2012/0221401 A1 | 8/2012 | Brown et al. | |
| 2012/0253913 A1 | 10/2012 | Richard | |
| 2012/0330744 A1 | 12/2012 | Aissa | |
| 2013/0006773 A1 | 1/2013 | Lutnick et al. | |
| 2013/0006782 A1 | 1/2013 | Schwarzkopf et al. | |
| 2013/0020389 A1 | 1/2013 | Barnett | |
| 2013/0059534 A1 | 3/2013 | Sobalvarro et al. | |
| 2013/0067546 A1 | 3/2013 | Thavasi et al. | |
| 2013/0080241 A1 | 3/2013 | Fisher | |
| 2013/0080972 A1 | 3/2013 | Moshrefi et al. | |
| 2013/0085835 A1 | 4/2013 | Horowitz | |
| 2013/0095755 A1 | 4/2013 | Moreton et al. | |
| 2013/0097040 A1 | 4/2013 | Fisher | |
| 2013/0110261 A1 | 5/2013 | Lee et al. | |
| 2013/0110682 A1 | 5/2013 | Rosenblatt et al. | |
| 2013/0132282 A1 | 5/2013 | Shakkarwar | |
| 2013/0144715 A1 | 6/2013 | Kranzley et al. | |
| 2013/0191213 A1 | 7/2013 | Beck et al. | |
| 2013/0191246 A1 | 7/2013 | Calman et al. | |
| 2013/0204728 A1 | 8/2013 | Lichterman et al. | |
| 2013/0221987 A1 | 8/2013 | Louie et al. | |
| 2013/0215467 A1 | 8/2013 | Fein et al. | |
| 2013/0218682 A1 | 8/2013 | Alterman et al. | |
| 2013/0268378 A1 | 10/2013 | Yovin | |
| 2014/0006205 A1 | 1/2014 | Berry et al. | |
| 2014/0006272 A1 | 1/2014 | Calman et al. | |
| 2014/0058955 A1 | 2/2014 | Calman | |
| 2014/0074637 A1 | 3/2014 | Hammad | |
| 2014/0074691 A1 | 3/2014 | Bank et al. | |
| 2014/0081855 A1 | 3/2014 | Hankins et al. | |
| 2014/0089178 A1 | 3/2014 | Lee et al. | |
| 2014/0089196 A1 | 3/2014 | Paya et al. | |
| 2014/0089672 A1 | 3/2014 | Luna et al. | |
| 2014/0100983 A1* | 4/2014 | Cavagnaro | G06Q 20/12 705/26.2 |
| 2014/0129357 A1 | 5/2014 | Goodwin | |
| 2014/0138435 A1 | 5/2014 | Khalid | |
| 2014/0172660 A1 | 6/2014 | Louie et al. | |
| 2014/0173063 A1 | 6/2014 | Jeong et al. | |
| 2014/0180826 A1 | 6/2014 | Boal | |
| 2014/0189836 A1 | 7/2014 | Eyler | |
| 2014/0201085 A1* | 7/2014 | Brendell | G06Q 20/325 705/64 |
| 2014/0207680 A1 | 7/2014 | Rephlo | |
| 2014/0214673 A1 | 7/2014 | Baca et al. | |
| 2014/0222670 A1 | 8/2014 | Concannon | |
| 2014/0274014 A1 | 9/2014 | Dodla | |
| 2014/0277805 A1 | 9/2014 | Browne et al. | |
| 2014/0279474 A1 | 9/2014 | Evans et al. | |
| 2014/0298027 A1 | 10/2014 | Roberts et al. | |
| 2014/0330654 A1* | 11/2014 | Turney | G06Q 20/14 705/15 |
| 2014/0351057 A1 | 11/2014 | Kwon et al. | |
| 2014/0351071 A1 | 11/2014 | Hong et al. | |
| 2014/0351147 A1 | 11/2014 | Castrechini et al. | |
| 2015/0019439 A1 | 1/2015 | Phillips | |
| 2015/0073907 A1* | 3/2015 | Purves | G06Q 20/32 705/14.58 |
| 2015/0088626 A1* | 3/2015 | Salmon | G06Q 30/0222 705/14.17 |
| 2015/0088631 A1 | 3/2015 | Mitchell | |
| 2015/0095224 A1 | 4/2015 | Blythe | |
| 2015/0100443 A1 | 4/2015 | Vann Heerden et al. | |

(56) References Cited

U.S. PATENT DOCUMENTS

| | | | |
|---|---|---|---|
| 2015/0100803 A1 | 4/2015 | Chen et al. | |
| 2015/0120473 A1 | 4/2015 | Jung et al. | |
| 2015/0127549 A1 | 5/2015 | Khan | |
| 2015/0154634 A1 | 6/2015 | Chiu et al. | |
| 2015/0156311 A1 | 6/2015 | Adams et al. | |
| 2015/0186871 A1 | 7/2015 | Laracey | |
| 2015/0220915 A1* | 8/2015 | Rosenberg | G06Q 20/32 705/39 |
| 2015/0302398 A1 | 10/2015 | Desai et al. | |
| 2015/0339318 A1* | 11/2015 | O'Toole | G06Q 20/29 705/40 |
| 2015/0356551 A1 | 12/2015 | Dogin et al. | |
| 2016/0055512 A1 | 2/2016 | Godsey et al. | |
| 2016/0057619 A1 | 2/2016 | Lopez | |
| 2016/0117667 A1* | 4/2016 | Kang | G06Q 20/22 705/39 |
| 2016/0162882 A1 | 6/2016 | McClung | |
| 2016/0192123 A1 | 6/2016 | Lim | |
| 2016/0321641 A1 | 11/2016 | Cady et al. | |
| 2017/0024733 A1 | 1/2017 | Purves | |
| 2017/0287321 A1 | 10/2017 | Ann et al. | |
| 2017/0295032 A1 | 10/2017 | Shin et al. | |
| 2018/0041591 A1 | 2/2018 | Yoden | |
| 2018/0050450 A1 | 2/2018 | Parrott et al. | |
| 2018/0248589 A1 | 8/2018 | Cronin | |
| 2018/0374073 A1* | 12/2018 | Zhao | G06Q 20/3224 |
| 2019/0172035 A1 | 6/2019 | Cronin | |
| 2019/0325426 A1 | 10/2019 | Cronin | |
| 2019/0326957 A1 | 10/2019 | Cronin | |

FOREIGN PATENT DOCUMENTS

| | | |
|---|---|---|
| WO | WO 2012/051071 | 4/2012 |
| WO | WO 2013/096486 | 6/2013 |

OTHER PUBLICATIONS

Thad Rueter, "NFC 'Add-On' Links Smart Phones, Contactless Pay", Paris Start-upTechnology Vendor, ATM & Debit News. (Year: 2009).*

U.S. Appl. No. 14/970,304, John Cronin, NFC Transaction Choices, filed Dec. 15, 2015.

U.S. Appl. No. 14/970,311, John Cronin, NFC Triggered Incentives at Point-of-Sale, filed Dec. 15, 2015.

U.S. Appl. No. 14/970,314, John Cronin, NFC Ubiquitous Modular Payment Terminal, filed Dec. 15, 2015.

U.S. Appl. No. 14/970,319, John Cronin, NFC ATM Vending Machine With Added Two Way Non-financial Data, filed Dec. 15, 2015.

U.S. Appl. No. 14/970,328, John Cronin, Payments Data Source Tagging for Accounts Statements, filed Dec. 15, 2015.

U.S. Appl. No. 14/970,056, John Cronin, NFC-Based Payment as a Service, filed Dec. 15, 2015.

U.S. Appl. No. 14/970,069, John Cronin, NFC Improving Content Transfer in Low Bandwidth NFC Payments Systems, filed Dec. 15, 2015.

U.S. Appl. No. 14/970,080, John Cronin, NFC Increased Biometrics Based on Transactions Parameters, filed Dec. 15, 2015.

U.S. Appl. No. 14/970,091, John Cronin, Interaction With Purchaser in NFC-Based Transaction, filed Dec. 15, 2015.

U.S. Appl. No. 14/970,102, John Cronin, NFC Center, filed Dec. 15, 2015.

U.S. Appl. No. 14/970,338, John Cronin, Payment Processes With Warranty Options, filed Dec. 15, 2015.

U.S. Appl. No. 14/970,340, John Cronin, Real Time Credit Offers, filed Dec. 15, 2015.

U.S. Appl. No. 14/970,125, John Cronin, NFC Transaction With Financial and Non-Financial Data, filed Dec. 15, 2015.

U.S. Appl. No. 14/970,144, John Cronin, Automatic Shopping Based on Historical Data, filed Dec. 15, 2015.

U.S. Appl. No. 14/970,304 Office Action dated Jan. 12, 2018.
U.S. Appl. No. 14/970,314 Office Action dated Mar. 8, 2018.
U.S. Appl. No. 14/970,328 Office Action dated Feb. 14, 2018.
U.S. Appl. No. 14/970,069 Office Action dated Mar. 28, 2018.
U.S. Appl. No. 14/970,080 Office Action dated Feb. 26, 2018.
U.S. Appl. No. 14/970,102 Final Office Action dated Nov. 30, 2017.
Airplus—Mobile Payment—How It Will Transform Corporate Travel and Expense Management, Apr. 18, 2012.
Case Study—Bill Splitting App for Restaurantst, 2013.
AuthenTec—AuthenTec Fingerpring Technology Featured in Two New Fujitsu NFC-enabled Mobile Phones from NTT Docomo, Nov. 16, 2011.
Balaban, Dan; "Spanish Bank Installs 'First' Contactless ATMs", NFC Times, Apr. 5, 2011.
Blaze Mobile Wallet, Jan. 2008.
Boden, Rian; "PrivatBank cuts ATM costs with NFC", NFC World, Nov. 5, 2013.
Borison, Rebecca; "Google Wallet adds geolocated loyalty to iOS, combats Passbook", Mobile Commerce Daily, Feb. 7, 2014.
Carson, Biz; "BitPay brings one-touch payments to bitcoin with new NFC-compatible checkout app." Nov. 4, 2014.
Cluckey, Suzanne; "New guide offers a comprehensive view of ATM and mobile integration", Mobile Payments Today, Nov. 28, 2014.
CommBank Small Business app User Guide, CommonwealthBank. Jul. 11, 2014.
Dai, Weihui; "An Integrated Mobile Phone Payment System Based on 3G Network", Journal of Networks, vol. 6, No. 9, Sep. 2011.
Dragt, Bruce; "Universal Commerce: A Seamless, Personalized Purchase Experience for Today's Connected Consumers", A First Data White Paper, 2012.
Fraser, Jeff; "The Mobile Shopper: Lose Your Wallet." Jun. 1, 2014.
Girt Mobile—Mobile Application Development Ireland, Dec. 2, 2014.
Google Wallet Privacy Policy, Nov. 16, 2011.
Hoyos Labs, Nov. 28, 2014.
I-Free Unveils New and Improved "Wallet": NFC Mobile App Now Stores Contactless Transport Cards and Discount Coupons, i-Free News, Nov. 7, 2013.
FAQ and Support—CashCloud.com, Dec. 3, 2014.
Itautec Mobicash, Feb. 13, 2013. Link: https://youtu.be/-qaL2QHliok (youtube video, no pdf).
Khan, Vaseem; "Contactless card reader by Diebold leverages NFC technology at ATM's to give cash", NFC, Payments, Oct. 10, 2013.
Keane, Byran; "Key Takeaways From Money2020 Industry Conf", Deutsche Bank Markets Research. Oct. 10, 2013.
Lawler, Ryan; "Square's Order App Can Now Predict When You'll Arrive to Pick Up Your Cappuccino", TechCrunch, Oct. 8, 2014.
Ma et al., Xiaohua; "The Architecture of Mobile Wallet System Based on NFC (Near Field Communication)", Research Journal of Applied Sciences, Engineering and Technology 7(12): 2589-2595, 2014, ISSN: 2040-7459; e-ISSN: 2040-7467, Mar. 29, 2014.
Mastin, Michelle; "Square vs.. Intuit GoPayment: Mobile Credit Card Systems Compared", Bizfeed, PCWorld, Sep. 6, 2011.
Mobile_Commerce_NFC_Coupons_and_Loyalty_Acceptance—Technical Proposal, Version 1.0, Jul. 1, 2014.
More Magic: Mobile Banking & Payment Applications, Nov. 30, 2014.
NEC—Integrated E-Money Solution, Jan. 20, 2014.
"New breed of ATM Visits Times Square", Mobileinfo.com, Issue #2001, Jul. 30, 2001.
NFC & Contactless—Mobile and card solutions, NFC & Mobile Money Summit, Oct. 14-17, 2013.
NFC ReTag Free—WidgApp Mobile Solutions Tools, Google Play, Jul. 17, 2014.
NFC White Paper—Alcatel-Lucent Mobile Wallet Service, Dec. 2011.
NXP—NFC for embedded applications: Your Critical link for the Internet of Things, Aug. 21, 2014.
Patni, Chandra; "Pouch NFC PayPass & PayWave Card Issuance, pouch-let your mobile pay!", www.yes-wallet.com, Apr. 13, 2012.
"Pay2You Places: shopping by geolocation", Connexions, Jul. 5, 2013.

(56) References Cited

OTHER PUBLICATIONS

Pourghomi et al., Pardis; "Cloud-based NFC Mobile Payments", Journal of Internet Technology and Secured Transactions (JITST), vol. 2, Issues 1/2/3/4, Mar.-Dec. 2013.
Pourghomi et al., Pardis; "A Proposed NFC Payment Application", International Journal of Advanced Computer Science and Applications, vol. 4, No. 8, 2013).
Reardon, Marguerite; Tibken, Shara; "Apple takes NFC maintstream on iPhone 6; Apple Watch with Apple Pay", CNET, Sep. 9, 2014.
Rodrigues et al., Helena; "MobiPag: Integrated Mobile Payment, Ticketing and Couponing Solution Based on NFC", Sensors 2014, 14, 13389-13415;ISSN 124-8220, Jul. 24, 2014.
Sreekumar, Shiny; "Biometric Authentication in Mobile Payments", Master Thesis, Information Management, Faculty of Computer Sciences, Sep. 2010.
Tamas, Fabian; "NFC-enabled Automated Teller Machine", Obuda University, NIK. Nov. 28, 2014.
TapWise—Near Field Communication (NFC) Services and Cloud-Based Tag Management, Dec. 1, 2014.
VoxLoc—Mastercard announces high level of success with biometric system. Sep. 23, 2014.
White Paper—Beyond the Hype: Mobile Payments for Merchants, 2013.
White Paper—Cloud Based Ticketing: Next Generation Fare Collection, Mar. 23, 2014.
White Paper—Mobile Commerce in Retail: Loyalty and Couponing, Jan. 2014.
White Pater—The Role of the Trusted Service Manager in Mobile Commerce, Dec. 2013.
Wollenhaupt, Gary; "Five Ways Mobile Technology will Revolutionize ATMs", White Paper—ATM MarketPlace, 2013.
U.S. Appl. No. 14/970,102 Office Action dated May 1, 2017.
U.S. Appl. No. 15/967,068, John Cronin, Managing NFC Data, filed Apr. 30, 2018.
U.S. Appl. No. 14/970,311 Office Action dated Apr. 4, 2018.
U.S. Appl. No. 14/970,319 Office Action dated Jun. 26, 2018.
U.S. Appl. No. 14/970,056 Office Action dated Apr. 5, 2018.
U.S. Appl. No. 14/970,091 Office Action dated Jun. 1, 2018.
U.S. Appl. No. 14/970,340 Office Action dated Apr. 5, 2018.
U.S. Appl. No. 14/970,144 Office Action dated May 17, 2018.
U.S. Appl. No. 14/970,304 Final Office Action dated Oct. 1, 2018.
U.S. Appl. No. 14/970,080 Final Office Action dated Sep. 21, 2018.
U.S. Appl. No. 15/967,068 Office Action dated Sep. 4, 2018.
U.S. Appl. No. 14/970,338 Office Action dated Jun. 28, 2018.
U.S. Appl. No. 14/970,125 Office Action dated Jun. 29, 2018.
U.S. Appl. No. 14/970,056 Final Office Action dated Nov. 2, 2018.
U.S. Appl. No. 16/378,262, John Cronin, Transaction Modification Based On Real-Time Offers, filed Apr. 8, 2019.
U.S. Appl. No. 14/970,319 Final Office Action dated Jan. 28, 2019.
U.S. Appl. No. 14/970,338 Final Office Action dated Jan. 25, 2019.
U.S. Appl. No. 14/970,125 Final Office Action dated Jan. 28, 2019.
U.S. Appl. No. 14/970,144 Final Office Action dated Jan. 7, 2019.
U.S. Appl. No. 14/970,311 Final Office Action dated Jun. 13, 2019.
U.S. Appl. No. 14/970,304 Office Action dated Jul. 12, 2019.
U.S. Appl. No. 14/970,311 Office Action dated Oct. 2, 2019.
U.S. Appl. No. 14/970,319 Office Action dated Jul. 10, 2019.
U.S. Appl. No. 14/970,080 Office Action dated Aug. 15, 2019.
U.S. Appl. No. 16/503,358 Office Action dated Jan. 7, 2020.
U.S. Appl. No. 14/970,311 Final Office Action dated Mar. 23, 2020.
U.S. Appl. No. 14/970,319 Final Office Action dated Apr. 6, 2020.
U.S. Appl. 16/271,677 Office Action dated Apr. 2, 2020.

* cited by examiner

Bill Splitting and Account Delegation for NFC

Payment Means Database

| Means | Account Number | Locations | Balance ($) | Note |
|---|---|---|---|---|
| Gift Card | 3216549826459871 | Big Eats | 25.00 | N/A |
| Credit Card (Visa) | 1234567891011112 | Visa | 33.18 | N/A |
| Coupon | AC564189 | Amazon | N/A | BOGO |
| Coupon | 314159 | Brocade Fabrics | N/A | 15% off 12/1/14 through 12/31/14 |
| Indirect Payment | 6547654198563256 | Visa | 35.00 | Taco Embarazada |
| | | | | |

FIG 7

Bill Splitting and Account Delegation for NFC

Transaction Database

| Transaction Number | Total ($) | | | | |
|---|---|---|---|---|---|
| 123456 | 100.00 | | | | |
| 123457 | 314.15 | | | | |
| 123458 | 598.23 | | | | |
| | | | | | |
| | | | | | |

FIG 9

Bill Splitting & Account Delegation for NFC

Active Payment Database

| User ID | Transaction Number | Payment Type | Number | Recorded Payment ($) |
|---|---|---|---|---|
| 987654 | 123456 | Gift Card | 3216549826459871 | 25.00 |
| 987654 | 123456 | Credit Card (Visa) | 1234567891011112 | 33.18 |
| 987655 | 123457 | Credit Card (AMEX) | 46412312398741 | 41.82 |
| 987656 | 123458 | Coupon | FE1514 | 5.00 |
| 987656 | 123458 | Credit Cart (Visa) | 1245326578459865 | 95.00 |
| | | | | |

FIG 10

Bill Splitting and Account Delegation for NFC

Customer GUI (Customer 1 NFC Device)

How do you wish to pay?

Location: Big Eats Big Eatery #789

SINGLE PAYMENT    SPLIT BILL

Total: $100.00

FIG 11

Bill Splitting and Account Delegation for NFC

Customer GUI (Customer 1 NFC Device)

SPLIT BILL SELECTED

Location: Big Eats Big Eatery #789

Select the payment means you wish to use:

Visa    XXXX XXXX XXXX 1112
Gift Card    XXXX XXXX XXXX 9871

Total: $100.00

Amount:

| 7 | 8 | 9 |
|---|---|---|
| 4 | 5 | 6 |
| 1 | 2 | 3 |
| 0 |   | . |

FIG 12

Bill Splitting and Account Delegation for NFC

*Customer GUI (Customer 1 NFC Device)*

Location: | Big Eats Big Eatery #789 |   | SPLIT BILL SELECTED |

Total: $100.00

Balance: $41.82

| Payment Type | Card Number | Amount | Paid? |
|---|---|---|---|
| Payment 1: Gift Card | XXXX XXXX XXXX 9871 | $25.00 | ✓ |
| Payment 2: Visa | XXXX XXXX XXXX 1112 | $33.18 | SCAN TO PAY |

*Submit Additional Payment*

FIG 13

Bill Splitting and Account Delegation for NFC

Customer GUI (Customer 2 NFC Device)

Location: Big Eats Big Eatery #789   SPLIT BILL SELECTED

Total: $100.00

Balance: $0.00

| Payment Type | Card Number | Amount | Paid? |
|---|---|---|---|
| | | | |

Payment 1: American Express   XXXXX XXXXXX 98741   $41.82   ✓

*Thank you!*

FIG 14

Bill Splitting and Account Delegation for NFC

Merchant GUI

| | | Payer | Payment Type | Card Number | Amount |
|---|---|---|---|---|---|
| Total: | $100.00 | | | | |
| Balance: | $0.00 | | | | |
| Payment 1: | | 1 | Gift Card | XXXX XXXX XXXX 9871 | $25.00 |
| Payment 2: | | 1 | Visa | XXXX XXXX XXXX 1112 | $33.18 |
| Payment 3 | | 2 | American Express | XXXX XXXXXX 98741 | $41.82 |

SPLIT BILL SELECTED

*Transaction Complete*

FIG 15

Bill Splitting and Account Delegation for NFC

Customer GUI (Customer 2 NFC Device)

SPLIT BILL SELECTED

How would you like your receipt?   On your device

Receipt

Payment: Credit Card

American Express
XXXXX XXXXXX 98741

Amount $41.82

FIG 17

BILL SPLITTING AND ACCOUNT DELEGATION FOR NFC

CROSS-REFERENCE TO RELATED APPLICATIONS

The present application claims the priority benefit of U.S. provisional application No. 62/093,101 filed Dec. 17, 2014 entitled "Bill Splitting and Account Delegation for NFC," the disclosure of which is hereby incorporated by reference.

BACKGROUND

Field of Invention

The present invention generally relates to near field communications (NFC). More specifically, the present invention relates to bill splitting and account delegation using NFC.

Description of the Related Art

Near field communication (NFC) is a form of contactless communication between devices (e.g. smartphones or tablets). Contactless communication allows a user to motion (e.g. wave or pass) the device over other NFC compatible devices to send information without the need to provide physical contact between the devices or to undergo multiple steps to set up a connection between the devices.

NFC maintains interoperability between different wireless communication methods and other NFC standards through the NFC Forum. The NFC Forum enforces strict standards that manufactures must meet when designing NFC compatible devices. These standards ensure that NFC between devices is secure and remains easy-to-use with different versions of the technology.

The technology behind NFC allows a device (also referred to as a reader, interrogator or active device) to create a radio frequency (RF) current that is used to communicate with other NFC compatible devices or a small NFC tag holding information that might be of interest to the reader. Passive devices, such as the NFC tag, can be provided in posters and other forms of media or advertising. These passive devices store information and communicate with the reader but do not actively read other devices.

Peer-to-peer communication between two active devices is also possible with NFC. This communication would allow both devices to send and receive information between the two devices.

Ways of making multi-party payments are known in the art. For example, restaurants and other service providers are capable of taking a single bill and splitting the bill into two or more portions based on a number of individuals who wish to pay for the total bill (e.g., splitting a total bill at a restaurant across four different checks). In such a scenario, each individual pays for a portion of the total bill resulting in the entire bill being paid by a collective group. U.S. patent publication number 2014/0074691 discloses an exemplary NFC device capable of splitting a bill.

There is, however, a lacking in the art whereby an NFC device is capable of splitting the bill and allowing one or more users on their NFC devices to apply gift cards, coupons, promotions, tips or other modifications to the amount due. Additionally, presently available NFC systems do not accept mixed payments (e.g., person A pays in cash and person B pays using NFC).

SUMMARY OF THE CLAIMED INVENTION

Embodiments of the present invention include systems and methods directed towards bill splitting and account delegation using near field communications (NFC). The systems and methods allow an NFC device to split a single bill into two or more portions, allow one or more users to apply gift cards, coupons, promotions, tips or other modifications to the amount due, and facilitate multiple different types of payment on the same bill using NFC.

BRIEF DESCRIPTION OF THE DRAWINGS

FIG. 7 illustrates an exemplary payment database.

FIG. 9 illustrates an exemplary transaction database.

FIG. 10 illustrates an exemplary active payment database.

FIGS. 11-14 illustrate exemplary Customer GUI found on a customer NFC device.

FIG. 15 illustrates an exemplary merchant GUI.

FIGS. 16-17 illustrate exemplary customer GUI once the receipt software has been initiated.

DETAILED DESCRIPTION

Figure 1:
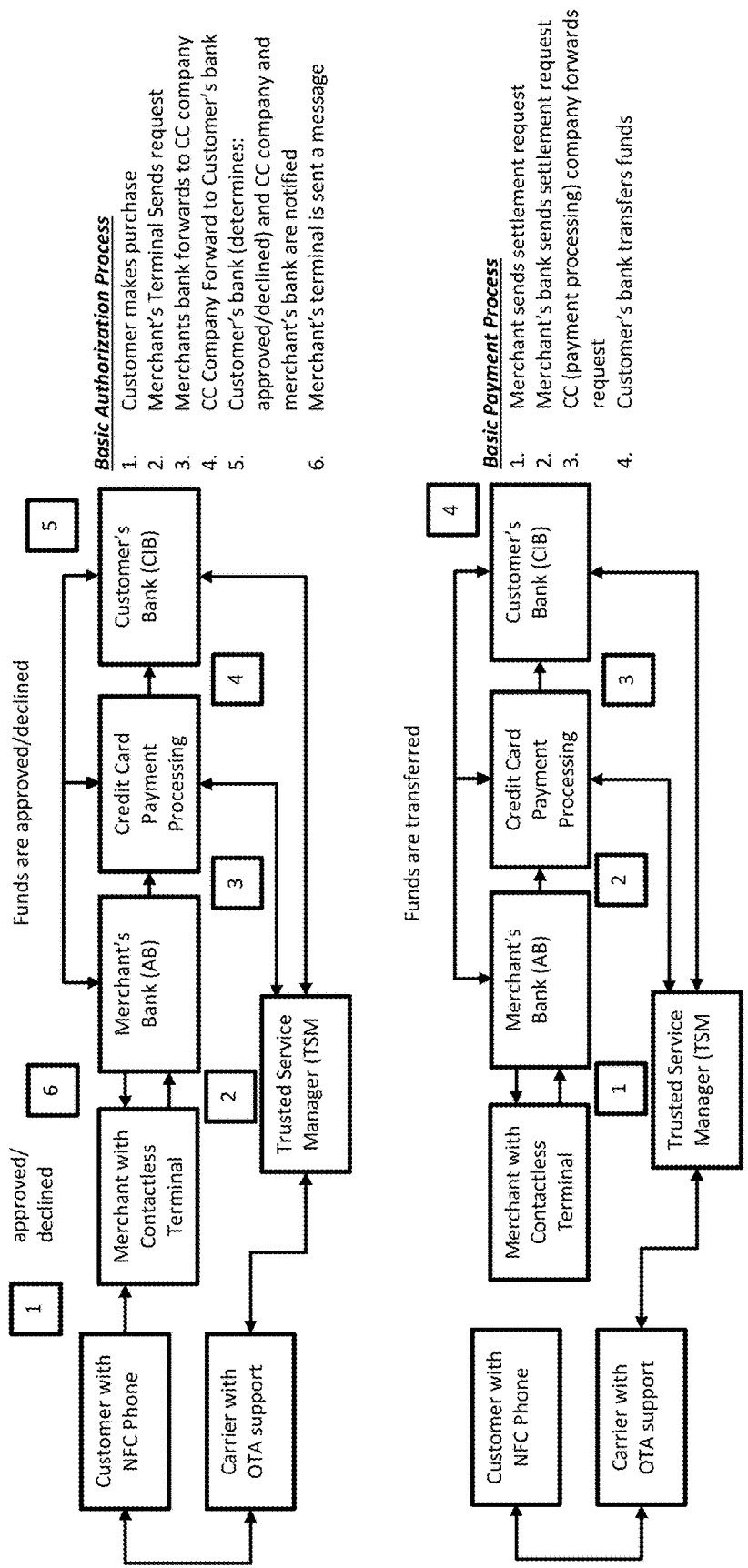
FIG. 1 illustrates the process for basic payment using NFC.

FIG. 1 illustrates the process for basic payment using near field communications (NFC). In particular, the FIG. 1 shows a general credit card approval payment process and general payment process using NFC.

With reference to the basic authorization process (shown as the top figure of FIG. 1), a customer can initiate the basic authorization process by buying one or more items with an NFC compatible device (e.g., smart phone). The customer NFC compatible device communicates with a merchant point of sales (POS) terminal. This POS terminal can be a contactless terminal for NFC transactions. POS can refer to a place where a transaction (e.g. purchase transaction) can be completed (e.g., cash register in a store).

Upon receiving a purchase request from the customer, the merchant terminal provides the request to the merchant bank. The merchant bank then forwards the request to the credit card payment processing. The credit card payment processing further forwards the request to the customer bank.

At the customer bank, a determination as to whether to approve or decline the request is made. This determination can be based on a variety of different parameters. The outcome of the determination (e.g., approved or declined) can be provided back to the credit card company and the merchant bank. The merchant terminal is afterwards informed by the merchant bank about the authorization status for the recent purchases of the customer.

Also seen in FIG. 1 in the basic authorization process, two further elements are included: the Trusted Service Manager (TSM) and carrier with OTA (over-the-air) programming. The TSM acts as a neutral broker that sets up secure connections between different elements. In this case, the TSM can find the encryption codes for communications between the credit card payment systems and the customer bank. On the other hand, the carrier with OTA programming may provide various methods for distributing new software updates, configuration settings and even updating encryption keys for the system.

FIG. 1 also includes an illustration outlining the process for basic payment using NFC. Similar steps are provided between the various elements (e.g., customer, merchant, credit card, TSM, carrier with OTA programming) as identified above for the basic authorization process. In particular, a merchant first sends settlement requests to the merchant bank. That request is forwarded to the credit card payment processing and to the customer bank. The customer bank then transfers the requested funds as necessary based on the request.

Figure 2:
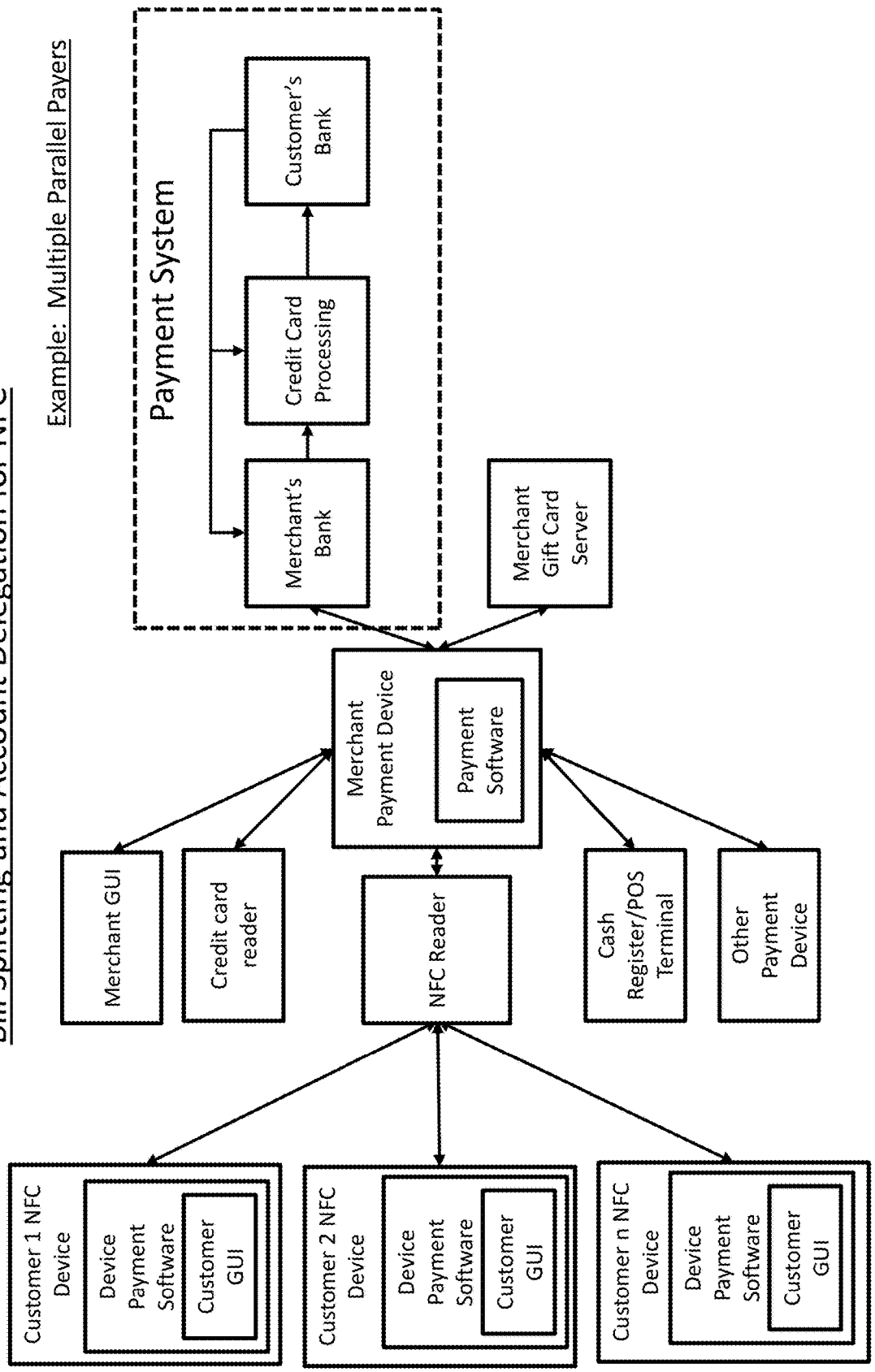
FIG. 2 illustrates a diagram showing an overall system of the present invention.

FIG. 2 illustrates a diagram showing an overall system of the present invention. The system includes one or more customer NFC devices (illustrated as Customer 1 NFC device, Customer 2 NFC device and Customer n NFC device), an NFC reader, merchant payment device, a credit card reader, merchant graphical user interface (GUI), a POS terminal, merchant gift card server, other payment devices and a payment system.

Each of the customer NFC devices can be a smartphone, tablet, mobile device, smartcard, coin system or any other device that has either an active or passive NFC transceiver. The foregoing devices have the requisite processor, memory, storage, and interfaces—both communications and interface—to allow for operability as are known in the art. Each of the NFC devices may also include device payment software used to operate the NFC transactions from the device side. The NFC devices may also include a customer GUI. The customer GUI enables display of information for the user to view and facilitates receiving inputs from the user as well.

Each of the customer NFC devices in the system is communicatively attached to the NFC reader. Although embodiments described in the present disclosure may make reference to communications entirely being NFC, other embodiments of the present invention may utilize both NFC and other types of communications (e.g., Bluetooth, wireless, laser, infrared).

The NFC reader is a device for receiving and transmitting data to and from the customer NFC devices. The NFC reader is communicatively connected to the merchant payment device. The communication between the NFC reader and the merchant payment device may be a wired connection (e.g., Ethernet, coaxial) or a wireless connection (e.g., Wi-Fi, Bluetooth). It should be noted that although the NFC reader is shown separate from the merchant payment device in FIG. 2, other embodiments may have these two elements integrated into one single device having multiple modules directed at performing the functions of the two elements.

The merchant payment device is a terminal that the merchant payment system uses to communicate with credit card processing system and other outside entities. For example, the merchant payment device may be envisioned as a cash register at a retail store or as a server to which all the cash registers communicate with.

The merchant payment device may include the merchant GUI. The merchant GUI can be used by salespersons or servers at the merchant place of business to observe and input data.

The credit card reader, as shown in FIG. 2 is a device for reading the magnetic strip or other data such as a smart chip on a credit card at a POS terminal (e.g., cash register). Other payment devices (e.g., debit cards) include any payment device not yet described herein. Each of the payment devices is connected to the merchant payment device, in a similar manner as the NFC reader, either through a wired connection or wireless connection.

The merchant payment device may include payment software. The payment software governs the transactions between the various readers (e.g., credit card, NFC, other payment devices) and terminals. The payment software also governs communications to and from the credit card processing service and any other service (e.g., merchant gift card server).

The merchant bank is connected to the merchant payment device. The communication can be wired, wireless or a combination. It may also be an indirect connection through one or more servers and/or through the cloud/Internet.

The merchant bank, credit card processing and customer bank are part of the payment system used to resolve and authorize payment requests. The payment system can operate similarly as provided in the prior art and as described above in FIG. 1.

Also communicatively connected to the merchant payment device is the merchant gift card server. The merchant gift card server can represent the merchant internal or external server and houses its gift card and couponing services. In other words, the merchant gift card server is one or more devices that track, receive and authorize the use of gift cards, coupons and other merchant-specific promotions or payment means used by the customer. Although only one server is shown here, in FIG. 1, for the merchant gift card server, multiple servers operating in parallel or multiple systems (e.g., one system for gift cards, one system for coupons) may also be implemented according to the present invention.

Once the payment software has determined that the sufficient payment has been received (e.g., credit card, cash, debit) collectively from each of the customers involved, the software completes the transaction and provides a notice to each of the customers indicating such to each of the customer GUI on their NFC devices.

Figure 3:
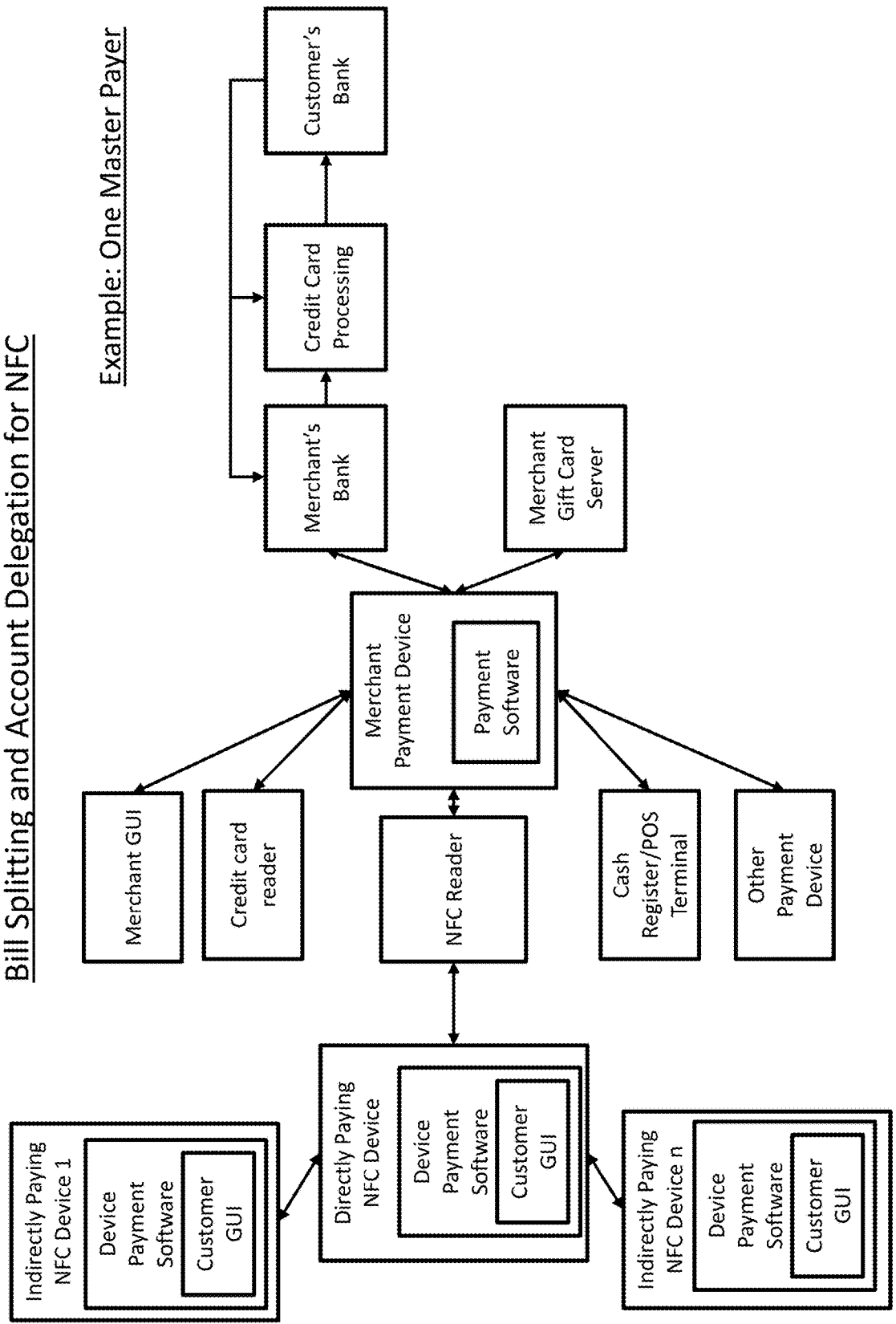
FIG. 3 illustrates a diagram showing another embodiment of the overall system of the present invention.

FIG. 3 illustrates a diagram showing another embodiment of the overall system of the present invention. In this embodiment, the elements shown are similar to the elements in FIG. 2. It should be noted, however, that now instead of each of the customer NFC devices paying directly by communicating with the NFC reader, all but one of the customer NFC devices may be paying indirectly through a directly paying NFC device. For example, there may be one customer NFC device that still communicates directly to the NFC reader to provide payment to the merchant payment device. The remaining customer NFC devices, however, provide their payments to the merchant payment device indirectly by forwarding their transaction to the one customer NFC device that directly communicates with the NFC reader. The communication between the indirectly paying NFC devices and the directly paying NFC devices can be wired, wireless or a combination.

The one directly-paying customer NFC, which communicates directly with the NFC reader, can obtain all the transactions from the other NFC devices and provide one transaction (e.g. payment information) to the merchant payment device. The system then uses all the payment information and operates in a similar manner as shown in FIG. 2.

Figure 4:
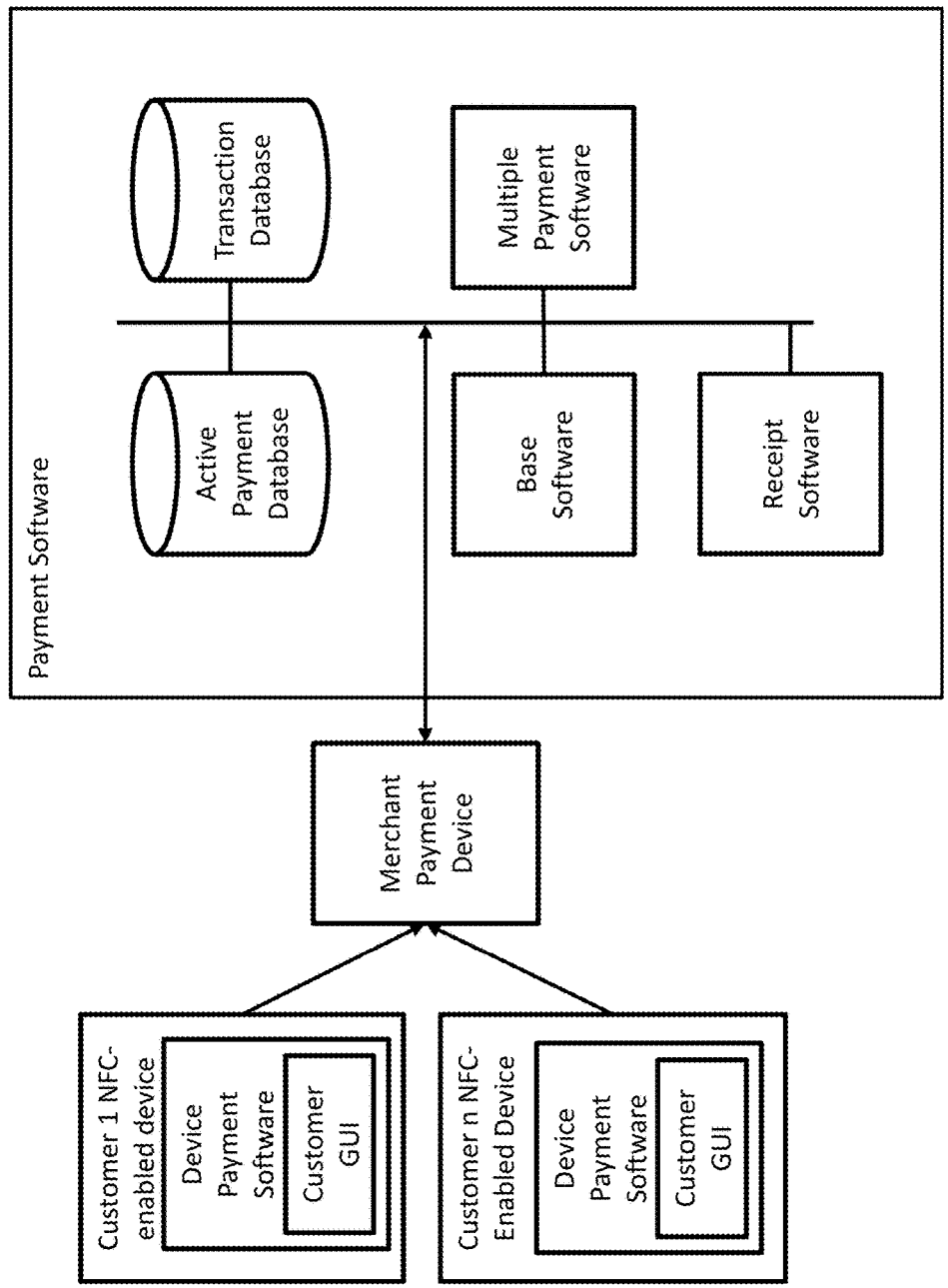
FIG. 4 illustrates exemplary payment software found in a merchant payment device.

FIG. 4 illustrates exemplary payment software found in a merchant payment device. As shown in FIG. 4, one or more customer NFC devices are in communication with the merchant payment device. For the purposes of clarity, the NFC reader and any other payment devices are omitted. The merchant payment device is connected to a main program bus. The main program bus connects to five elements for the payment software. The five elements include a transaction database, an active payment database, base software, receipt software and multiple payment software.

The transaction database contains data concerning each transaction. This data can include the price of each item purchased and any other data that the merchant may wish to store. The active payment database stores data related to the individual payments made for each transaction. For example, a transaction may be that a meal was shared by four individual people. The transaction database would store the transaction information for the meal. Payments from the four individual people would, however, be individually stored in the active payment database.

The base software is the software that operates the payment system. The base software also allows customers to select various payment and receipt options. The multiple payments software is software that is used by the customers to pay using multiple payment means. The multiple payment software can also be used to split the transaction (e.g., bill) into any number of parts. The parts themselves may be equal or proportioned based on input from one or more of the customers. The receipt software governs how customers wish to receive receipt information.

The five elements described above, although shown within one payment software, may also be implemented in one or more software modules. Furthermore, although the five elements are all implemented in the same device using a program bus, it is possible that the elements can be implemented in different device and connected using a physical bus.

Figure 5:
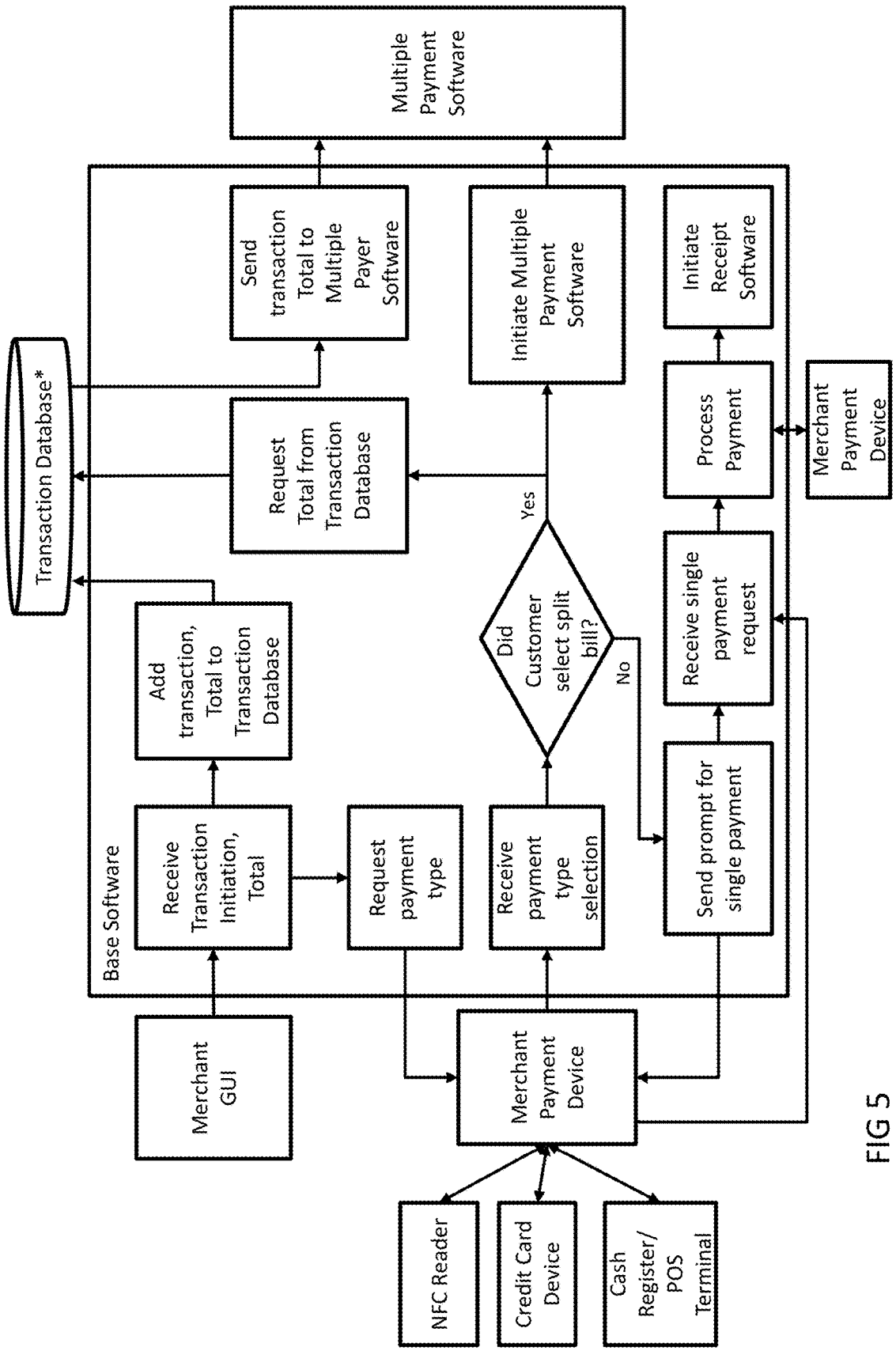
FIG. 5 illustrates exemplary base software of the payment software.

FIG. 5 illustrates exemplary base software of the payment software. The base software initiates when a transaction is provided to the merchant payment device. The input can come from a merchant GUI (e.g. salesperson or server) where information has been inputted into the merchant payment device. The base software receives the transaction and a corresponding total price. The transaction may include an itemized list of all the goods and/or services that were sold in the transaction.

After the information about the transaction and the total price is obtained, they are both stored to the transaction database. The base software can also request payment for the transaction. This request is provided from the merchant payment device back to the various customer devices. Each of the customer devices can then select a particular payment type and provide payment information back to the merchant payment device to satisfy the payment request.

The base software then determines if the payment has been split over two or more customers. If only a single payment was received from one customer, the base software notifies the merchant payment device accordingly and returns the payment information for the payment request to be processed. The processing of the payment request can include providing the payment information from the merchant payment device to the payment system. The information can also be provided to other systems (e.g., the gift card server) prior to the payment system to provide modifications to the payment request from the merchant payment device (e.g., discount on the total price for the transaction). Once the payment has been processed, the receipt software (described later in FIG. 18) is initiated.

If the base software determines that the transaction has been split over two or more customers, however, the base software obtains the total cost of the transaction from the transaction database. This is to ensure that the payment information provided by the two or more customers satisfies the total cost as indicated in the payment request. Afterwards, the base software provides a multiple payer request and the total cost from the transaction database to the multiple payer software. Further details about the multiple payer software are discussed in the context of FIG. 8.

Figure 6:
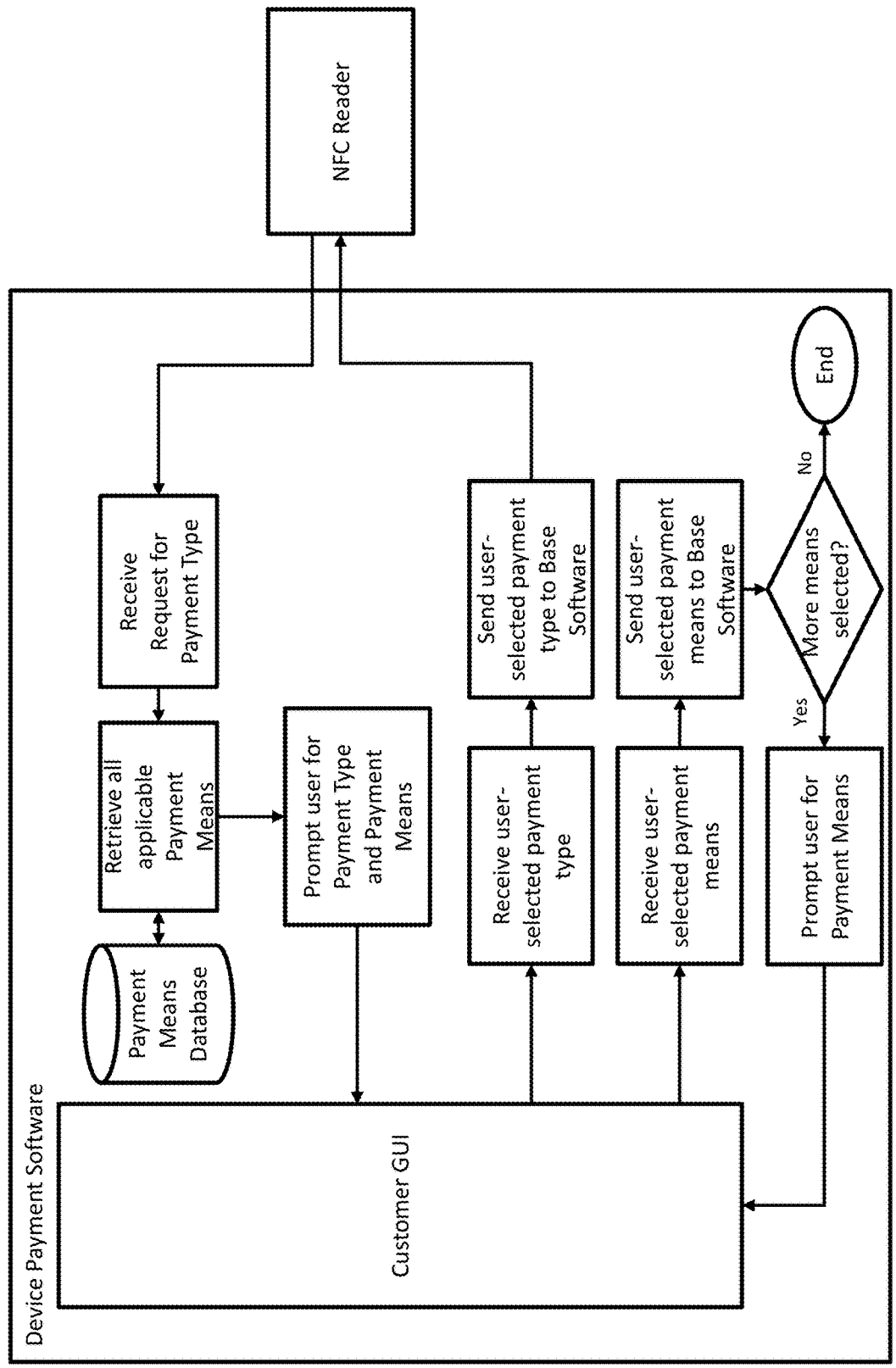
FIG. 6 illustrates exemplary device payment software found in a customer NFC device.

FIG. 6 illustrates exemplary device payment software found in a customer NFC device. The software initiates when a request for payment is received from the NFC reader by a customer NFC device. The payment request can be the same payment request provided by the merchant payment device described in FIG. 5 above.

After the request is received by the customer NFC device, the payment software retrieves all applicable payment from the payment database. Further details for the payment database are provided below in the context of the discussion of FIG. 7. The payment database includes the various way the customer can make a payment (e.g., credit card, debit card, gift card, coupon) all stored locally on the NFC device. The information in the payment database can be provided and/or updated by the customer. Payments that are not applicable (e.g., coupons that do not apply or are expired) are not retrieved.

From all the applicable payments retrieved, the customer is then prompted to select a payment type. The prompt can be provided on the customer GUI of the customer NFC device. The GUI may also provide an option to split the cost of the payment with other customers. If more payments are to be provided, the payment software loops until all the payment types have been obtained and sent. The customers selected payment type and information about whether the payment is split is provided to the base software of the merchant payment device (as described with respect to FIG. 5).

FIG. 7 illustrates an exemplary payment database. The payment database can include five columns that store information such as payment type, information about the payment type, locations where the payment is accepted, balance for the payment type and any additional information, if applicable, about that payment type that may be desired. The additional information may be notes about coupons or promotions or conditions for using that particular payment type. It should be noted that the database can include more or less information as well as include different types of information. The purpose of the database is to store information about the various payment types that a customer has access to on their mobile device.

Figure 8:
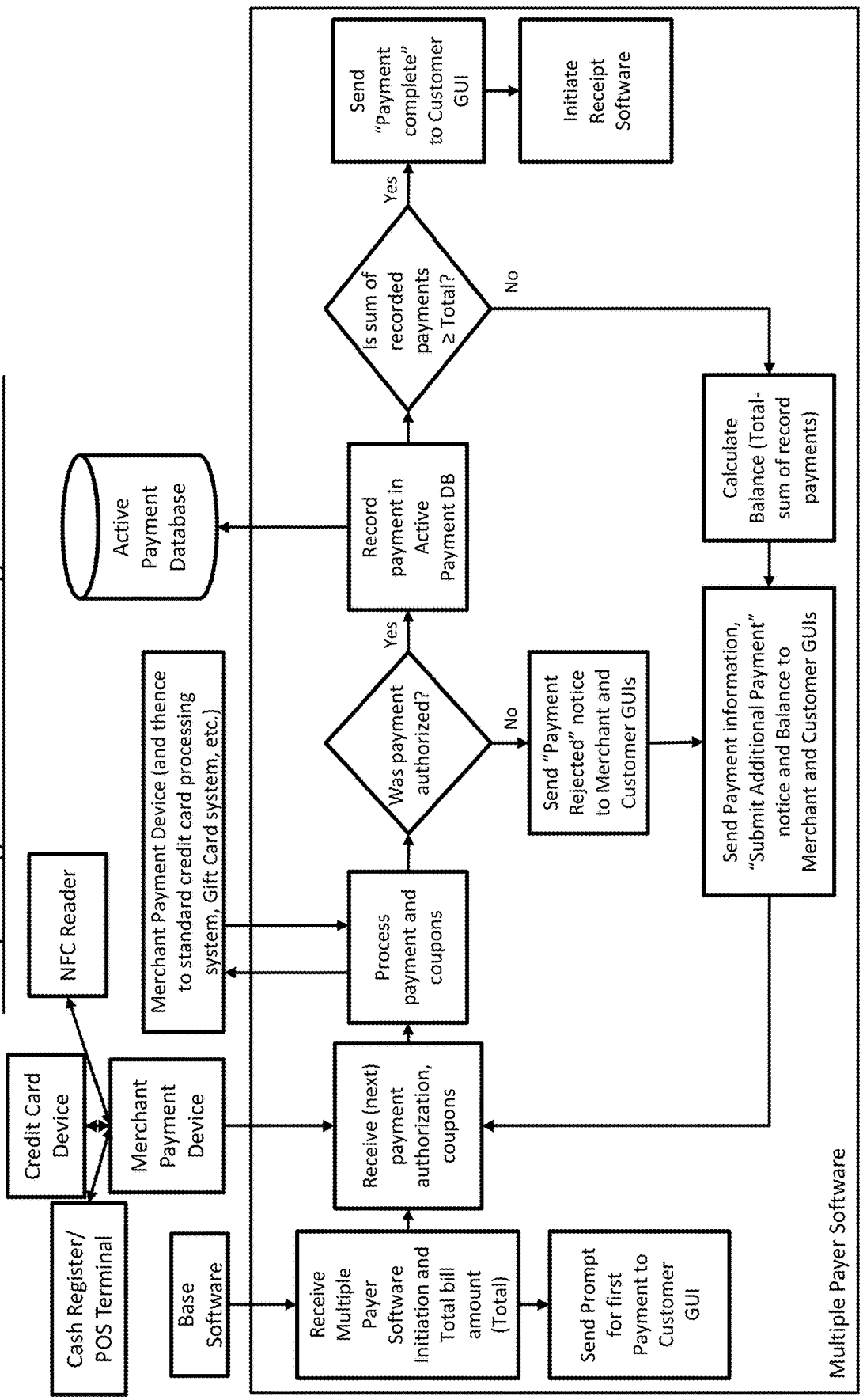
FIG. 8 illustrates exemplary multiple payer software.

FIG. 8 illustrates exemplary multiple payer software. As discussed above with respect to FIG. 5, this software is initiated if the base software detects that multiple payments have been received for a single payment request because the customers split the payments among themselves. The multiple payer software receives the total bill amount and a multiple payer software initiation from the base software as described above. The multiple payer software next prompts the two or more customers, on their customer GUI, to provide payment. The multiple payer software receives the payment from each of the customers via the payment devices (e.g., credit, debit, POS). Afterwards the multiple payer software can process the payments and any applicable coupons using the merchant payment device. Each payment is forwarded based on their payment type for authorization (e.g., credit card to the credit card system, coupon to merchant gift card server).

The multiple payer software afterwards determines if the payments were authorized. If one or more of the payments were rejected, the multiple payer software provides notice to the customer GUIs as well as to the merchant. The notice may include payment information and request for additional payment for a remaining balance of the pending transaction. The multiple payer software then polls for additional payments that are then provided for authorization in the same way as the first group of payment information provided.

Once all payments from the customers have been authorized, the multiple payer software checks to see if the sum of the recorded payments from the two or more customers is equal to or greater than the total amount that was provided to the multiple payer software from the base software. If yes, the multiple payer software initiates the receipt software. Otherwise, the multiple payer software calculates an outstanding balance that is the difference between the total amount and the amount paid. This balance is then provided to the merchant and the customer to be resolved in a similar manner as described above for situations when payments were not authorized. In other words, the multiple payer software will continue to request and process additional payments from the customers until the total amount paid is greater than or equal to the total amount for the transaction.

FIG. 9 illustrates an exemplary transaction database. The transaction database, as shown in FIG. 9, includes two columns of information: a transaction number identifying a unique transaction and a total amount for that particular transaction. As discussed above, the total amount for a transaction is helpful in determining if two or more customers have satisfied the total payment requests for the goods and/or services in a particular transaction facilitated by the multiple payer software. Also discussed above, the transaction data may include other information as well including an itemized list of items and/or services with their corresponding prices or subtotals based on groupings of items and/or services. It should be noted that the transaction database can include additional information as well as different types of information not described here.

FIG. 10 illustrates an exemplary active payment database. The active payment database, as shown in FIG. 10, can include columns containing information such as user ID, transaction number, payment type, account number for the payment type and the recorded payment. The user ID would correspond to each unique customer device submitting a payment. The transaction number identifies the transaction that the payments are being provided for. The payment type lists the method of payment that a particular customer may use (e.g., credit, debit, cash, coupon). The account number provides corresponding information for the payment type. For example, the account number may identify a particular credit card account, bank account, gift card number. The recorded payment identifies the amount that the particular customer has paid towards that transaction. Alternatively, if a coupon is used, the amount of the coupon can be provided with the "recorded payment" although no actual money was provided from the customer.

FIGS. 11-14 illustrate exemplary Customer GUI found on a customer NFC device. With reference to FIG. 11, an example of a GUI where the customer has received a prompt for payment is shown. The payment is for a meal for a total price of $100.00. The GUI provides the options to make one single payment or to split the total price among two or more other customers. In particular, an embodiment as shown in FIG. 11 may have a user who may wish to split the bill with other individuals who may have shared the meal. The decision to split the bill may be implemented by utilizing a cursor and interacting with the split option in the GUI.

FIG. 12 shows another customer GUI. In particular, the customer GUI can be one that is found subsequent to the customer GUI in FIG. 11 where the customer chose to split the bill.

In the customer GUI of FIG. 12, the customer can be prompted to select a method of payment and a payment amount. For example, as shown in the figure, the customer has the option to select between an available credit card and a gift card. This selection can be provided using a drop down menu. The amount that the customer wishes to pay can be provided through the customer GUI as well. This can be provided, for example, by using the provided keypad. Other methods of input, such as touch screen or voice recognition can also be provided to receive inputs from the customer on their NFC device.

FIG. 13 illustrates another customer GUI where the customer has selected two forms of payment: gift card and credit card. The user has also inputted two amounts for each of the forms of payment. The GUI can include information about whether the payment has already been processed (e.g., indicated as paid) or may still need to be processed. Furthermore, the customer GUI may include information about the total price that needs to be paid as well as any remaining balance that is yet to be paid by the other customers in which the bill is being split with. In fact, if the remaining balance is non-zero, meaning that the total balance has not been paid off, notification can be provided in the customer GUI that additional payments may still be necessary. Furthermore, options can be provided for the customer to provide additional payments to fulfill the remaining balance.

FIG. 14 illustrates another customer GUI on a different NFC device that is sharing the split bill with the customer device shown in FIGS. 11-13. The customer GUI can provide information about the transaction (e.g., location and total cost) as also provided in the customer GUI in FIGS. 11-13. This second customer can also provide a method of payment and payment amount in a similar manner as the customer described in FIGS. 12-13. It should be noted that the balance, noted in FIG. 14, shows that the total cost of the meal has been paid off. This coincides with the customer in FIGS. 11-13 and the customer in FIG. 14 providing payment for the combined total cost of the meal. Once the balance is zero, a notification on the customer GUI can also be provided to indicate that the total cost of the items/service has been paid off (e.g., Thank you).

It should be noted that FIGS. 11-14 illustrate an example where two customers have split the bill for a meal. Embodiments may include, however, any number of customers. Each customer GUI can operate in a similar manner as shown in the above figures whereby each customer can select payment types and amounts until the total cost has been paid for.

FIG. 15 illustrates an exemplary merchant GUI. In particular, the merchant GUI shows the different payments provided by the customers from FIGS. 11-14. The information about the different payments may include identification as to which customer paid using which payment means, account information for the payment means as well as the amount paid. The merchant GUI may also include the total cost of the transaction, the remaining balance (if any), that the bill has been split and a note that the transaction has been complete.

Figure 16:
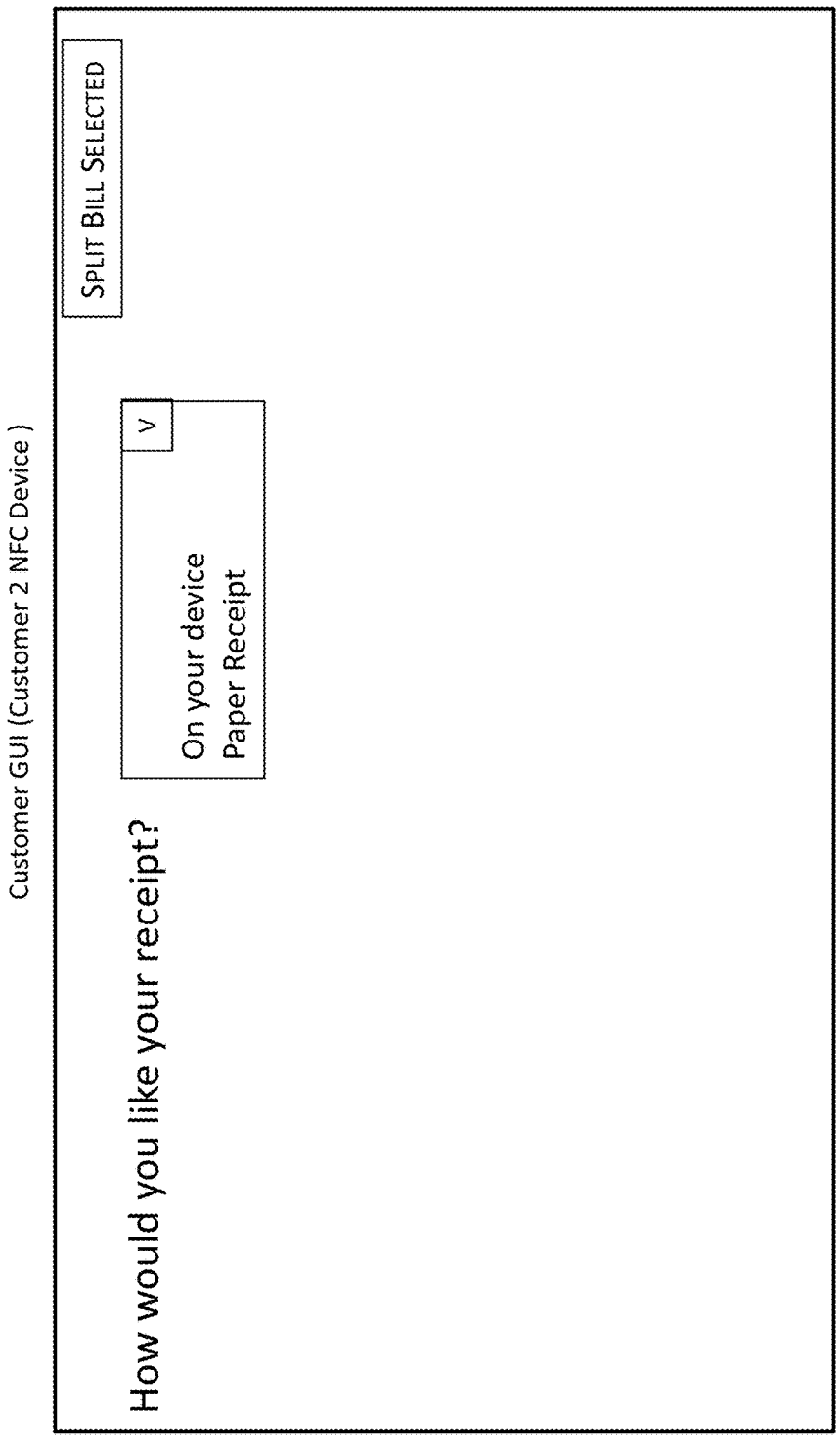

FIGS. 16-17 illustrate exemplary customer GUI once the receipt software has been initiated. In particular, FIG. 16 illustrates an embodiment once payment for the items and/or services has been completed and the response software is initiated. Once this happens, the customer GUI may provide an option for the customer to select how the receipt can be provided from the merchant to the customer. The customer may be able to select the option by using the customer GUI (e.g., cursor, touch screen).

Turning to FIG. 17, a customer GUI where the customer has selected to receive the receipt on their mobile device is shown. Below the receipt delivery selection, information for the payment is provided as a receipt for the customer to view in accordance to the selection above.

Figure 18:
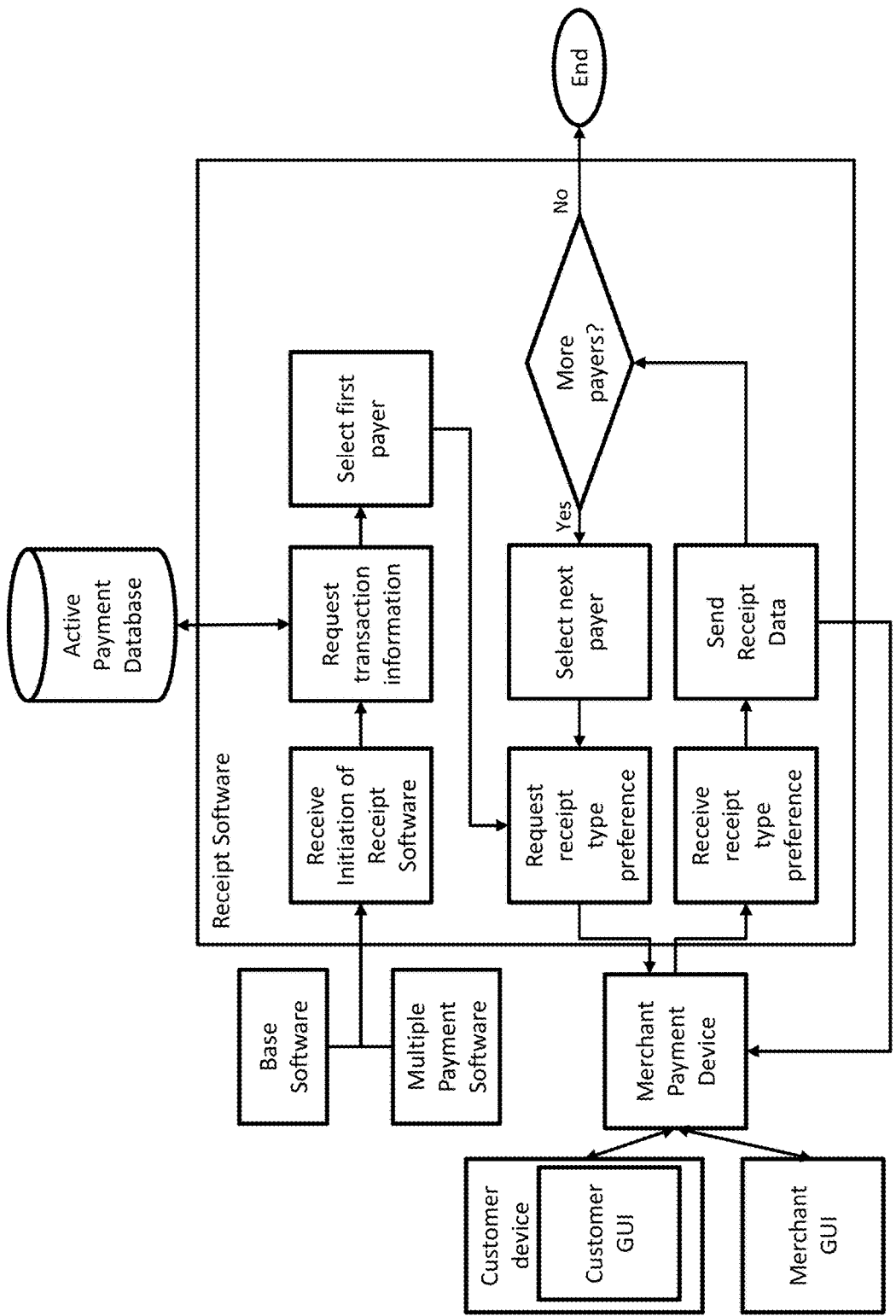
FIG. 18 illustrates exemplary receipt software.

FIG. 18 illustrates exemplary receipt software. The receipt software can be initiated either from the base software (when there is only one customer paying) or the multiple payment software (when more than one customer is paying a split bill). Once the receipt software is initiated, the software requests information about the transaction from the active payment database. The active payment database stores all the payments that were made for this (and other) transactions.

For each customer who paid for the selected transaction, the receipt software prompts the customer to select a receipt type preference. The request can be provided either to the customer GUI on their customer NFC device or on a merchant GUI for the customer to interact with. It is also possible that the salesperson or server (e.g., merchant GUI) may also request a receipt for the same transaction using similar GUI as shown in FIGS. 16-17.

Once the receipt type preference is obtained from the customer, the receipt data is sent to the merchant payment device to be provided to, for example, the customer GUI to view or to a printer. The receipt software repeats this process for each customer who paid, asking for receipt type preference, obtaining information about the payment and then providing the information to the particular paying customer.

Figure 19:
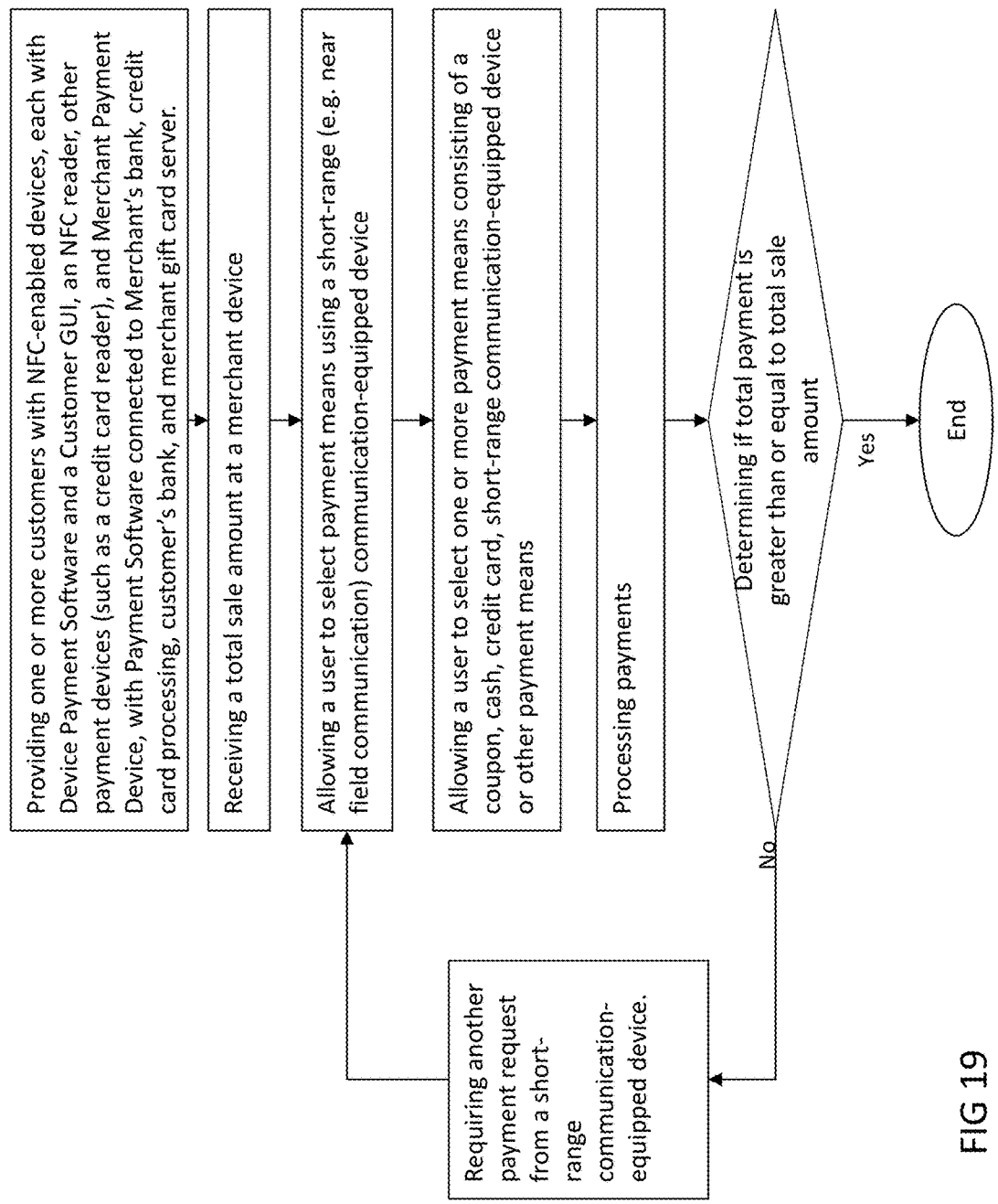
FIGS. 19-20 illustrate exemplary methods for bill splitting and account delegation using NFC.
Figure 20:
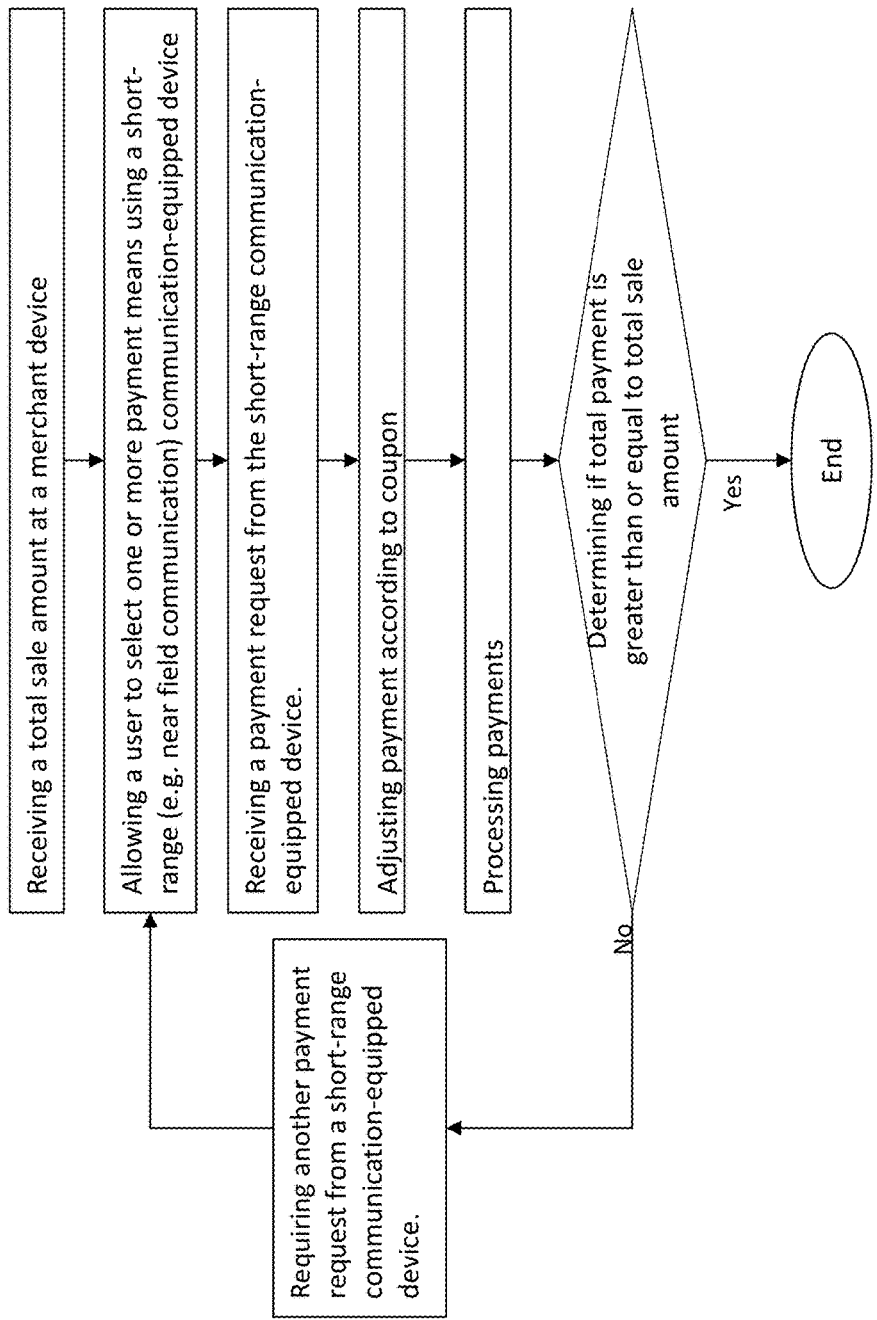

FIGS. 19-20 illustrate exemplary methods for bill splitting and account delegation using NFC. In particular, the first step is to provide the elements to facilitate the present invention including one or more customers with NFC enabled devices where each device has device payment software and a customer GUI, an NFC reader, payment devices (e.g., credit card reader, debit card reader, merchant POS), and a merchant payment device. The merchant payment device has payment software and is connected to the payment system and merchant gift card server. The payment system includes the merchant bank, the credit card processing and the customer bank.

The method next includes a step for receiving a total sale amount at the merchant payment device. Afterwards, the customers may be allowed to select a payment means. The selection can be performed using NFC. Next, the customer can select one or more payment means (e.g., coupon, cash, credit card, or other payment means). In other words, this is the step that allows the customers to select how they would like to pay the outstanding total.

After the payment method has been selected, the payments are processed. Subsequently, the method determines if the total payment has been satisfied. If not, additional requests are provided to the customers until the total amount has been paid. Otherwise, receipt requests will be provided to provide records to the customers recording the payments made for the transaction.

It should be noted that software may be stored in any various forms of non-transitory forms of memory as are known in the art. Software stored in memory may be executed by a processor or processing devices at a computing device. The computing device may be mobile in nature such as a mobile phone or tablet device. The computing device executing the instructions from memory may have one or more communications interfaces that allow for connection to wired or wireless networks as well as interaction with wired or wireless devices, including NFC devices.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for using near field communication (NFC) for bill splitting and account delegation, the method comprising:
   obtaining information about an NFC transaction initiated via an NFC interface, the information including a total transaction amount;
   receiving a request via the NFC interface to split the total transaction amount of the initiated NFC transaction into two or more portions, each portion assigned to a different user device;
   receiving confirmation information from the assigned user devices regarding fulfillment of each respective assigned portion of the initiated NFC transaction, wherein at least one of the assigned user devices further provides discount information;
   modifying the total transaction amount based on the discount information provided by the at least one assigned user device;
   identifying that a current total fulfillment amount does not yet meet the modified total transaction amount; and
   sending at least one notification requesting additional payments to the assigned user devices until the current total fulfillment amount meets the modified total transaction amount.

2. The method of claim 1, wherein at least one of the assigned user devices is designated for making a direct fulfillment payment via the NFC interface.

3. The method of claim 2, wherein at least one other of the assigned user devices provides respective confirmation information to the designated user device.

4. The method of claim 3, further comprising receiving the respective confirmation information via the NFC interface as forwarded by the designated user device.

5. The method of claim 3, wherein the at least one other user device provides the respective confirmation information to the designated user device over a wireless communication network.

6. The method of claim 3, wherein the designated user device tracks the respective confirmation information in association with an identifier of the at least one other assigned user device.

7. The method of claim 2, wherein the designated user device tracks a remaining balance of the total transaction amount not met by the current total fulfillment amount.

8. The method of claim 1, wherein the notification indicates one or more options for fulfilling a remaining balance of the total transaction amount not met by the current total fulfillment amount.

9. The method of claim 1, further comprising modifying the initiated NFC transaction by splitting the modified total transaction amount of the modified NFC transaction into a plurality of NFC transactions based on a number of the assigned user devices.

10. An apparatus for using near field communication (NFC) for bill splitting and account delegation, the apparatus comprising:
an NFC interface that:
obtains information about an initiated NFC transaction that includes a total transaction amount;
receives a request to split the total transaction amount of the initiated NFC transaction into two or more portions, each portion assigned to a different user device;
receives confirmation information from the assigned user devices regarding fulfillment of each respective assigned portion of the initiated NFC transaction wherein at least one of the assigned user devices further provides discount information;
a processor that executes instructions stored in memory, wherein execution of the instructions by the processor modifies the total transaction amount based on the discount information provided by the at least one assigned user device and identifies that a current total fulfillment amount does not yet meet the modified total transaction amount; and
a wireless communication network interface that sends at least one notification requesting additional payments to the assigned user devices until the current total fulfillment amount meets the modified total transaction amount.

11. The apparatus of claim 10, wherein at least one of the assigned user devices is designated for making a direct fulfillment payment via the NFC interface.

12. The apparatus of claim 11, wherein at least one other of the assigned user devices provides respective confirmation information to the designated user device.

13. The apparatus of claim 12, wherein the NFC interface further receives the respective confirmation information as forwarded by the designated user device.

14. The apparatus of claim 12, wherein the at least one other user device provides the respective confirmation information to the designated user device over a wireless communication network.

15. The apparatus of claim 12, wherein the designated user device tracks the respective confirmation information in association with an identifier of the at least one other assigned user device.

16. The apparatus of claim 11, wherein the designated user device tracks a remaining balance of the total transaction amount not met by the current total fulfillment amount.

17. The apparatus of claim 10, wherein the notification indicates one or more options for fulfilling a remaining balance of the total transaction amount not met by the current total fulfillment amount.

18. The apparatus of claim 10, wherein the processor executes further instructions to modify the initiated NFC transaction by splitting the modified total transaction amount of the modified NFC transaction into a plurality of NFC transactions based on a number of the assigned user devices.

19. A non-transitory computer-readable storage medium, having embodied thereon a program executable by a processor to perform a method for using near field communication (NFC) for bill splitting and account delegation, the method comprising:
obtaining information about an NFC transaction initiated via an NFC interface, the information including a total transaction amount;
receiving a request via the NFC interface to split the total transaction amount of the initiated NFC transaction into two or more portions, each portion assigned to a different user device;
receiving confirmation information from the assigned user devices regarding fulfillment of each respective assigned portion of the initiated NFC transaction, wherein at least one of the assigned user devices further provides discount information;
modifying the total transaction amount based on the discount information provided by the at least one assigned user device;
identifying that a current total fulfillment amount does not yet meet the modified total transaction amount; and
sending at least one notification requesting additional payments to the assigned user devices until the current total fulfillment amount meets the modified total transaction amount.

* * * * *